Jan. 28, 1958 G. U. BRUMBAUGH 2,821,407
SIDESWAY-CONTROLLING VEHICLE FRAME SUSPENSION SYSTEM
Filed April 26, 1956 4 Sheets-Sheet 1
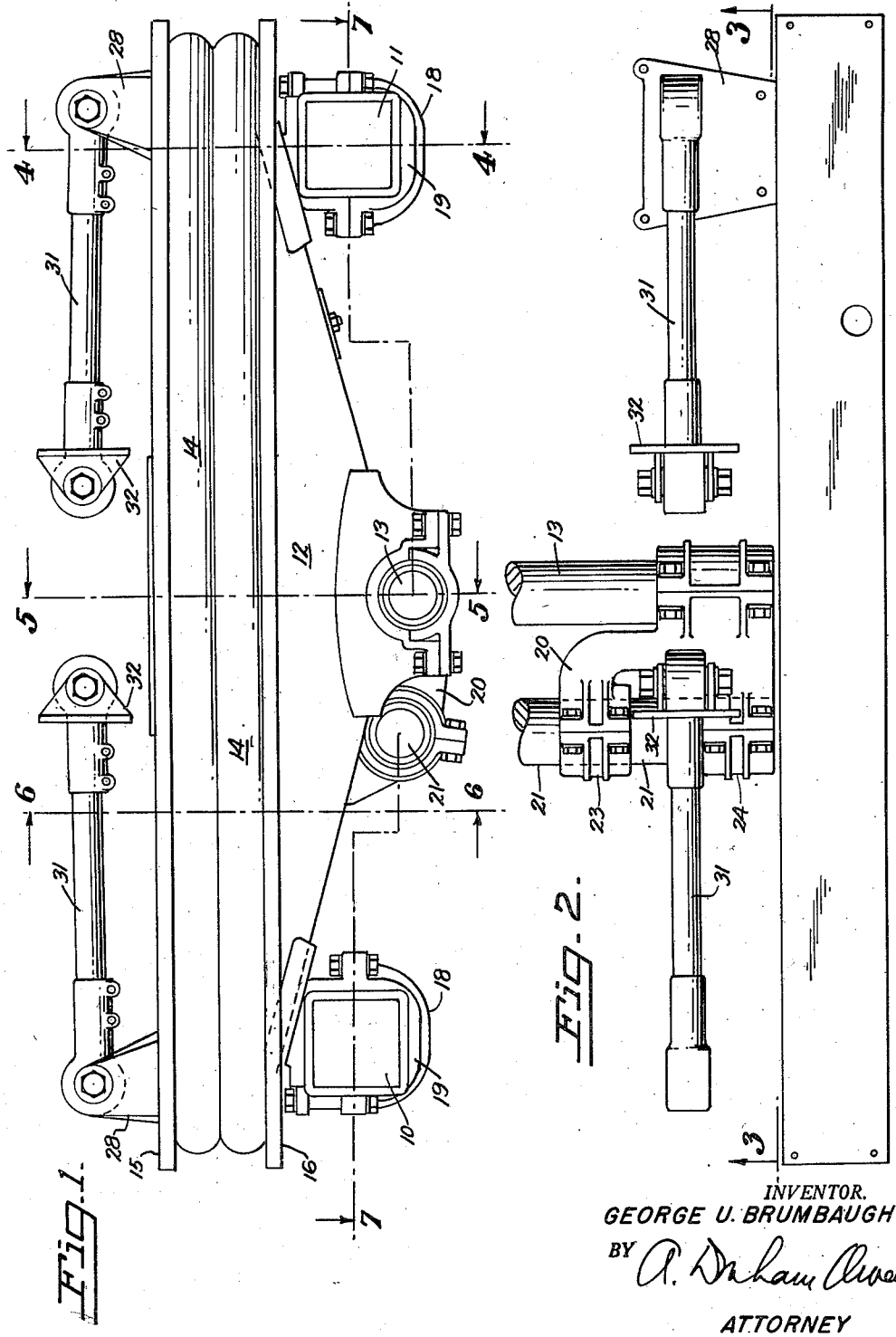
INVENTOR.
GEORGE U. BRUMBAUGH
BY
ATTORNEY

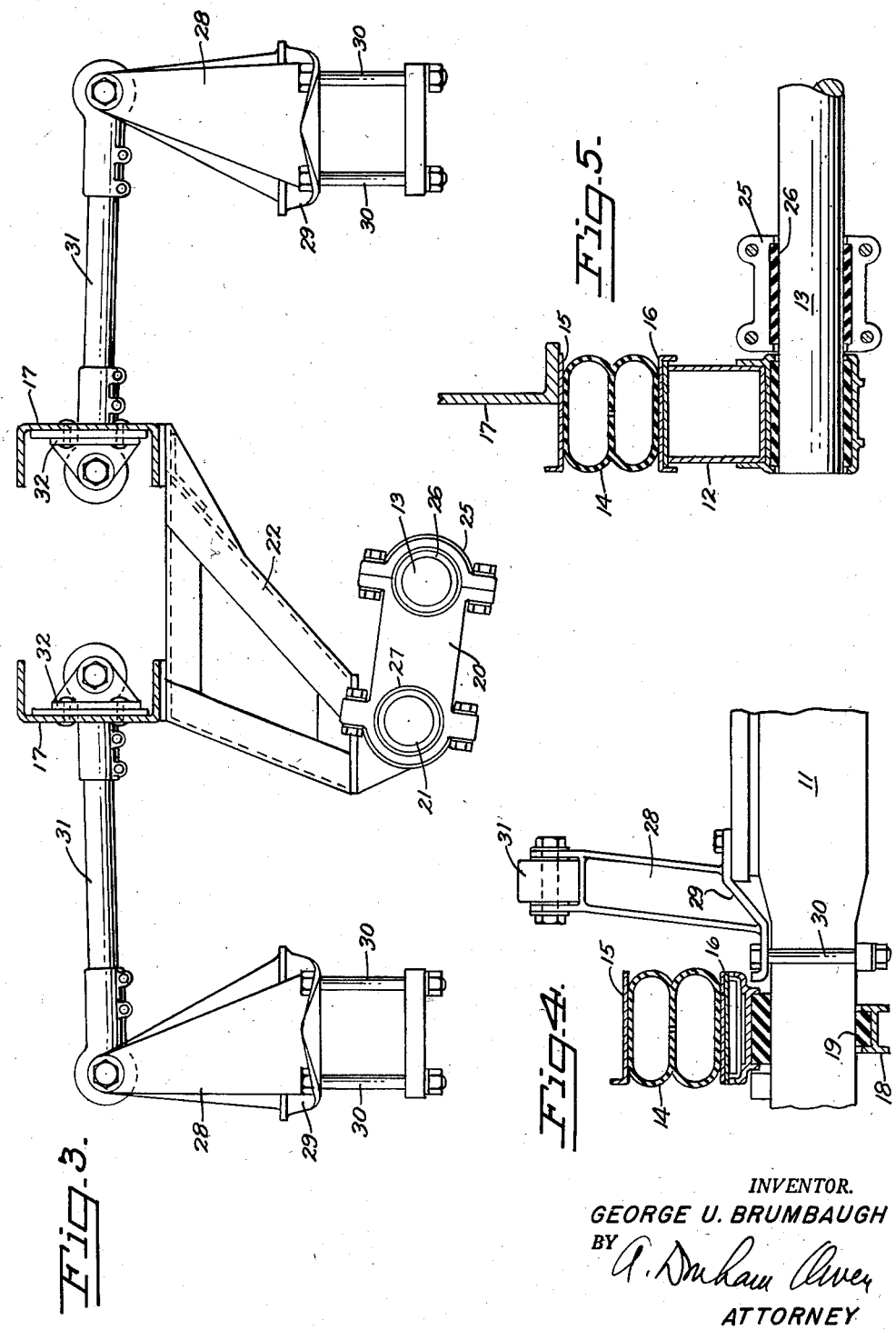

Jan. 28, 1958  G. U. BRUMBAUGH  2,821,407
SIDESWAY-CONTROLLING VEHICLE FRAME SUSPENSION SYSTEM
Filed April 26, 1956  4 Sheets-Sheet 3

INVENTOR.
GEORGE U. BRUMBAUGH
BY
ATTORNEY

Jan. 28, 1958 G. U. BRUMBAUGH 2,821,407
SIDESWAY-CONTROLLING VEHICLE FRAME SUSPENSION SYSTEM
Filed April 26, 1956 4 Sheets-Sheet 4

INVENTOR.
GEORGE U. BRUMBAUGH
BY
ATTORNEY

United States Patent Office
2,821,407
Patented Jan. 28, 1958

2,821,407

SIDESWAY-CONTROLLING VEHICLE FRAME SUSPENSION SYSTEM

George U. Brumbaugh, Palo Alto, Calif., assignor to Peterbilt Motors Company, Oakland, Calif., a corporation of California Application April 26, 1956, Serial No. 580,761

5 Claims. (Cl. 280—104.5)

This invention relates to improvements in vehicle suspension systems and particularly such systems which employ air springs, or other resilient spring means requiring control means between the axle supporting frame and the vehicle frame.

The problem generally heretofore existing has been the lack of rigidity of the suspension system, which, in one air spring system was overcome by a very rigid mechanism which tied together the two sides of the vehicle so that both air supported side beams moved vertically in a generally parallel position relative to the vehicle frame, and of necessity at the same rate. This imposed heavy loads and stresses on the rigid mechanism.

Another problem with this earlier air spring system was that to permit the motion of the stabilizing means required that the frame pedestals be secured to the trunnion tube with a rubber bushing. This prevented the trunnion tube from tying the two frame pedestals to each other with a rigid connection.

Other problems will become apparent as this description proceeds.

An object of the present invention therefore is to provide a controlled resiliency to the sidewise angular motion of the vehicle vertical center line.

Another object is to permit a rigid linking of the frame pedestals by means of the trunnion tube.

Another object is to reduce the extreme stresses built up in the structure due to sidesway of the vehicle.

Another object is to allow the two radius rod elements to operate independently, thus eliminating the high stresses and allowing the desired amount of controlled sidesway. As used herein "sidesway" means the tilting of the body and load relative to the axles and ground line about a fore and aft axis.

Another object of the invention is to provide controlled sidesway by means of the thickness and length of the rubber bushings in the radius rods. Radius rod, as used herein, differs a little from its usual usage, in that here it is being used to describe a member which functions (a) like the usual radius rod and in addition (b) controls sidesway by limiting any relative angular displacement of the trunnion shaft and the transverse shaft, and (c) also resists lateral displacement of the two shafts.

The latter refers to a controlled lateral shift which occurs when rounding a curve at sufficient speed to apply a sidewise force to the frame and load. The importance of this can be appreciated when it is realized that, except for such controls, the load is floating on the air springs.

In the drawings:

Fig. 1 is a view in side elevation of the suspension system taken on a line inside the wheels and brake drums.

Fig. 2 is a view in plan of the same parts as in Fig. 1. Here only one side is shown, as both sides of the vehicle are alike, and the axles are omitted.

Fig. 3 is a view in side elevation taken on the line 3—3 in Fig. 2.

Fig. 4 is a view in end elevation and partly in section looking from right to left taken on the line 4—4 in Fig. 1.

Fig. 5 is a view in section taken on the line 5—5 in Fig. 1.

Figure 6:
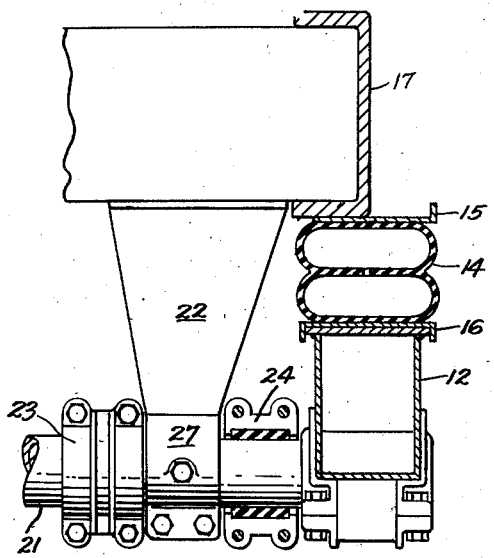
Fig. 6 is a like view partly in section taken on the line 6—6 of Fig. 1.

The suspension system shown in the drawings is particularly adapted for use on heavy trucks or trailers employing tandem axles 10 and 11 secured near their outer ends to side beams 12, which side beams are in turn mounted on a transverse shaft 13, to permit each side beam to oscillate. In the drawings, except for Figs. 4, 7 and 8, only the parts on one side of the vehicle are shown, so it should be understood that the parts on each side of the fore and aft center line are alike.

While I have shown a pneumatic type suspension means comprising an inflatable tube or air spring 14, it should be understood that any suitable resilient supporting means may be employed. The air spring 14 lies between a top channel 15 and a lower channel 16, the latter being secured to or forming a part of the top of the side beam 12. The upper channel 15 is secured to the frame 17 of the vehicle (Fig. 6). The box-like side beam 12 in the device used to illustrate the invention incorporates a surge tank to provide additional air capacity to control the spring rate of the air spring. It forms no part of my invention, nor is there need to describe the mechanism by which the air pressure is built up and kept in balance.

As shown in Figs. 1 and 4 the axles 10 and 11 are secured by suitable axle clamps 18 embracing a rubber or rubber-like bushing 19, to the ends of the side beam 12.

The driving and braking torque is taken from the axles 10 and 11 through the side beams 12 to the vehicle frame 17 by means of what I term radius rods 20 pivotally secured to a trunnion shaft 21 mounted in the lower ends of frame pedestals 22. Preferably the trunnion shaft 21 is non-rotatably secured in its bearings in the frame pedestals thereby obtaining the advantage of tying together and strengthening the very vulnerable frame pedestals 22.

Figure 7:
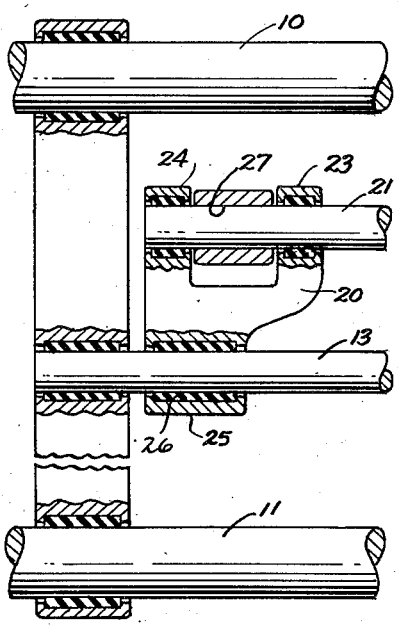
Fig. 7 is a diagrammatic view in plan taken on the line 7—7 in Fig. 1.
Figure 8:
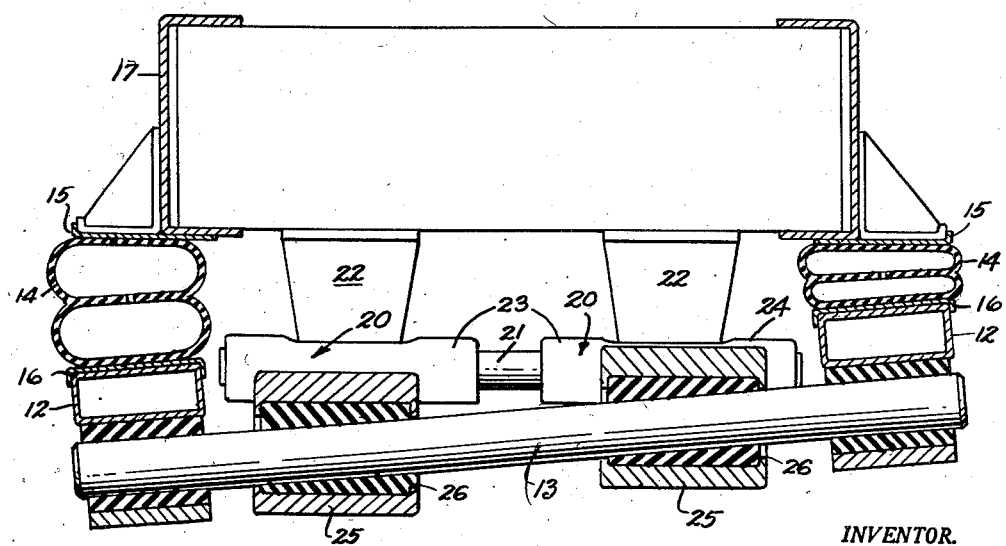
Fig. 8 is a diagrammatic view in cross-section taken on the line 5—5 in Fig. 1, illustrating a condition of sidesway and how the rubber bushings permit and control the condition.

Each radius rod 20, as shown in Figs. 2, 7 and 8, preferably is Y-shaped, thus providing spaced apart bearings 23 and 24 engaging the trunnion shaft 21 so as to control any axial or lateral shifting of the transverse shaft 13 relative to the trunnion shaft 21. The bearing 25, in what could be termed the base of the Y, embraces the radius rod 20 and controls the vehicle sidesway. Preferably it is provided with a rubber or rubber-like bushing 26. By making the bushing thinner or by making it longer, the resistance to sidesway is increased. Whereas, by making the bushing thicker or by making it shorter, the resistance to sidesway is decreased. The possible limits to the controlled sidesway will be determined by the proportion of the radial clearance to the length of the bushing. Thus, by varying the axial extent and the radial clearance of the bearings 25 on the transverse shaft, the engineer can control and give any desired permissive sidesway to a vehicle. This has been found to be an important factor in large capacity vehicles employing air springs or other resilient supports having an equivalent floating effect.

It is preferred that the trunnion shaft 21 be mounted in bearings 27 connected to the frame 17 by rigid members 22 which project down in between the arms of the radius rod 20 and the bearings 23, 24.

In the diagrammatic drawing of Fig. 7 is shown the basic structure with which this invention is concerned and in Fig. 8 is shown, in slightly exaggerated fashion, the tilting or sidesway effect and how the radial clearance and axial length of the bearings 25 (with bushings 26) controls the possible misalignment of the transverse shaft 13 with the trunnion shaft 21. Fig. 8 also shows how the axially spaced bearings 23, 24 which rotatably support the radius rods 20 on the trunnion shaft 21 maintain the bearings 23, 24 in substantial axial alignment with that shaft 21 and thereby confine the permitted misalignment to the bearings 25 and bushings 26 on the transverse shaft 13. Fig. 7 also shows how the radius rods 20 effectively control and limit any lateral shifting of the axle supporting frame 12 relative to the frame pedestals 22, secured to the load supporting frame 17 while still permitting the desired amount of sidesway movement of the frames 12 and 17 relative to each other.

The balance of the structure shown in the drawings and to be described typifies a current suspension system being offered on the market and to which my invention is applied to improve it.

Looking at Figs. 1, 2 and 3, these other parts include the torque rod bracket 28 having a saddle portion 29 at its lower end adapted to be non-rotatably secured by the bolts 30 to the vehicle's axle housing or beams 10 and 11. The upper end of the bracket 28 is pivotally secured to one end of a torque rod 31, which in turn is pivotally secured to a bracket 32 on the load carrying frame 17 of the vehicle. There is such a construction for each axle as is shown in Fig. 3 for example. This structure functions primarily to prevent rotation of the axle housing or beam 11 when applying the brakes, and if 11 denotes a driving axle, when the driving power of the engine is applied to the axle.

Figure 9:
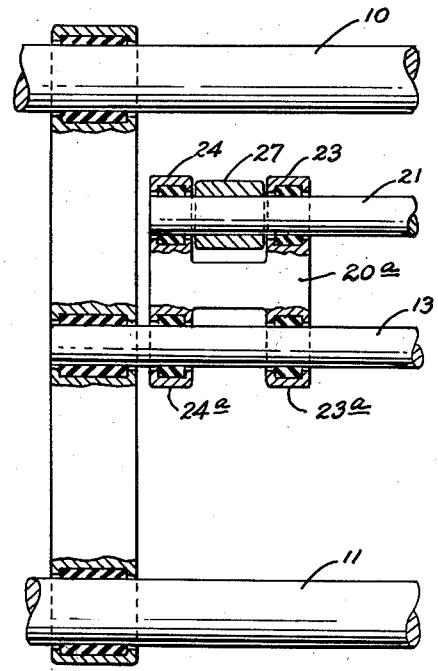
Fig. 9 is a view similar to Fig. 7 showing a modified form of the invention.
Figure 10:
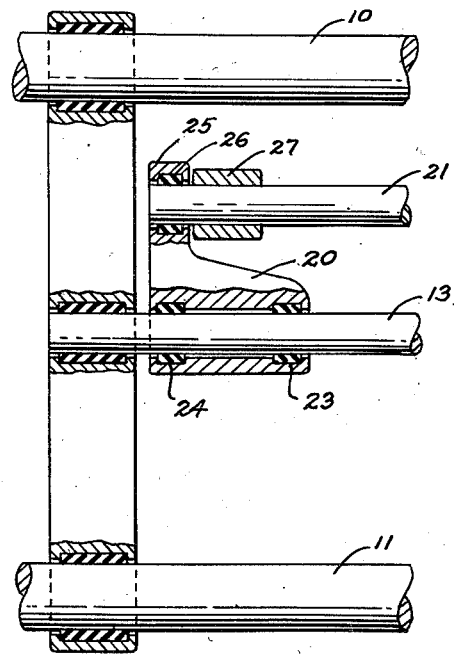
Fig. 10 is another view similar to Fig. 7 showing another modified form of the invention.

While the Y-shaped member has been shown with the two bearings 23, 24 on the trunnion shaft 21, they may instead be on the transverse shaft 13 and have the single bearing 25 on the trunnion shaft 21 (Fig. 10). Also, in cases where additional stiffness or resistance to sidesway is needed, an H-shaped member 20ª (Fig. 9) may be used, thereby providing two spaced apart bearings 23ª, 24ª, 23, and 24 on each shaft 13 and 21.

What I claim is:

1. In a vehicle suspension system providing controlled sidesway having a load supporting frame, an axle supporting frame, and resilient load supporting spring means interposed between each of said frames, a brake and drive force applying connection between said frames which will allow said frames a limited tilting movement about each other on the longitudinal axis of the vehicle, including a cross-wise laterally extending connecting shaft member near each side of and secured to said axle supporting frame; laterally extending connecting shaft members secured to said load supporting frame and spaced away from said first mentioned shaft members; a radius rod, located near each side of said frames having bearings rotatably engaged with the aforesaid pair of shaft members adjacent its side of said frames; each said radius rod having rubber or rubber-like bushings engaging said shaft members whereby said frames at all times retain a generally aligned lateral, fore and aft, and rotational position in a horizontal plane, and yet may assume a controlled position in the same general plane and in planes at an angle to each other as road or load conditions effect a tilting of one frame in relation to the other about the longitudinal axis of the vehicle, each said radius rod having bearings of different axial lengths, with the bearing which engages the shaft member on the axle supporting frame made shorter than the bearing which engages the shaft member on the load supporting frame.

2. In a vehicle suspension system providing controlled sidesway having a load supporting frame, an axle supporting frame, and resilient load supporting spring means interposed between each of said frames, a brake and drive force applying connection between said frames which will allow said frames a limited tilting movement about each other on the longitudinal axis of the vehicle, including a cross-wise laterally extending connecting shaft member near each side of and secured to said axle supporting frame; laterally extending connecting shaft members secured to said load supporting frame and spaced away from said first mentioned shaft members; a radius rod, located near each side of said frames having bearings rotatably engaged with the aforesaid pair of shaft members adjacent its side of said frames; each said radius rod having rubber or rubber-like bushings engaging said shaft members whereby said frames at all times retain a generally aligned lateral, fore and aft, and rotational position in a horizontal plane, and yet may assume a controlled position in the same general plane and in planes at an angle to each other as road or load conditions effect a tilting of one frame in relation to the other about the longitudinal axis of the vehicle, each said radius rod having a longer effective bearing surface on its shaft member secured to the load supporting frame than the bearing surface on its shaft member secured to the axle supporting frame, whereby said bearings with the longer effective bearing surfaces will remain substantially aligned with the shaft member on which they are pivoted, whereas each bearing with the shorter bearing surface will be permitted a controlled amount of misalignment between it and the shaft member it engages by the displacement in the bushings.

3. In a vehicle suspension system providing controlled sidesway having a load supporting frame, an axle supporting frame, and resilient load supporting spring means interposed between each of said frames, a brake and drive force applying connection between said frames which will allow said frames a limited tilting movement about each other on the longitudinal axis of the vehicle, including a cross-wise laterally extending connecting shaft member near each side of and secured to said axle supporting frame; laterally extending connecting shaft members secured to said load supporting frame and spaced away from said first mentioned shaft members; a radius rod, located near each side of said frames having bearings rotatably engaged with the aforesaid pair of shaft members adjacent its side of said frames; each said radius rod having rubber or rubber-like bushings engaging said shaft members whereby said frames at all times retain a generally aligned lateral, fore and aft, and rotational position in a horizontal plane, and yet may assume a controlled position in the same general plane and in planes at an angle to each other as road or load conditions effect a tilting of one frame in relation to the other about the longitudinal axis of the vehicle, said radius rods comprising generally Y-shaped pieces, each having the bearing which pivotally engages the shaft member secured to the axle supporting frame located in the base of the Y-shaped piece and the bearings which pivotally engage the shaft member secured to the load supporting frame located in the end of the upper arms of the Y-shaped piece.

4. The device of claim 3 in which said Y-shaped pieces are reversed.

5. In a vehicle suspension system providing controlled sidesway having a load supporting frame, an axle supporting frame, and resilient load supporting spring means interposed between each of said frames, a brake and drive force applying connection between said frames which will allow said frames a limited tilting movement about each other on the longitudinal axis of the vehicle, including a cross-wise laterally extending connecting shaft member near each side of and secured to said axle supporting frame; laterally extending connecting shaft members secured to said load supporting frame and spaced away from said first mentioned shaft members; a radius rod, located near each side of said frames having bearings rotatably engaged with the aforesaid pair of shaft members adjacent its side of said frames; each said radius rod having rubber or rubber-like bushings engaging said shaft members whereby said frames at all times retain a generally aligned lateral, fore and aft, and rotational position in a horizontal plane, and yet may assume a controlled position in the same general plane and in planes at an angle to each other as road or load conditions effect a tilting of one frame in relation to the other about the longitudinal axis of the vehicle, said radius rods comprising generally H-shaped pieces having a bearing at the end of each leg.

References Cited in the file of this patent
UNITED STATES PATENTS 2,103,381    Perkins _____ Dec. 28, 1937
2,660,450    Stigum _____ Nov. 24, 1953